No. 888,034. PATENTED MAY 19, 1908.
G. REPP.
BAKE OVEN.
APPLICATION FILED MAR. 18, 1907.

3 SHEETS—SHEET 1.

WITNESSES: INVENTOR.
George Repp
BY W. B. Hutchinson
ATTORNEY.

No. 888,034.
PATENTED MAY 19, 1908.
G. REPP.
BAKE OVEN.
APPLICATION FILED MAR. 18, 1907.
3 SHEETS—SHEET 2.
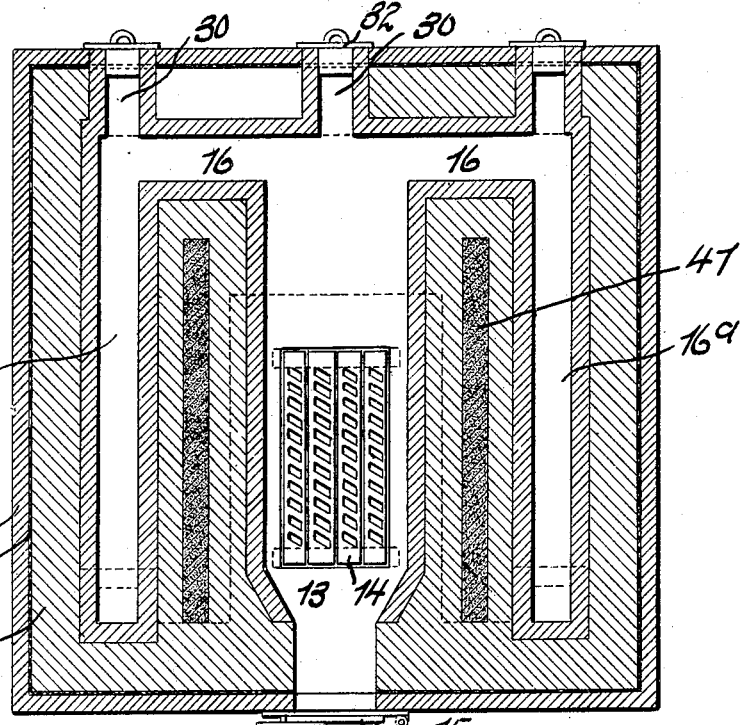
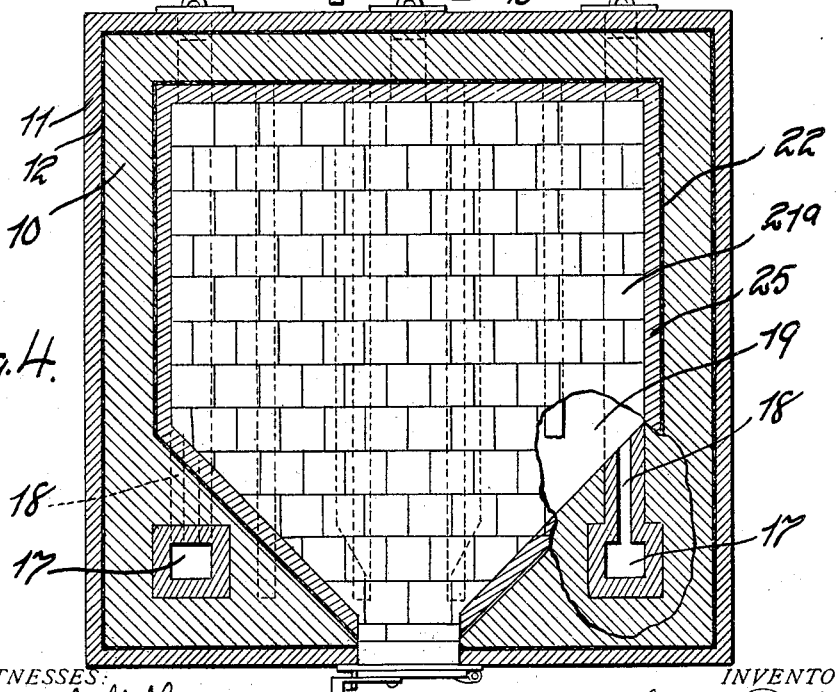
WITNESSES:
Frank L. Stubbs.
Ralph Lancaster.
INVENTOR.
George Repp.
BY W. B. Hutchinson,
ATTORNEY.

No. 888,034. PATENTED MAY 19, 1908.
G. REPP.
BAKE OVEN.
APPLICATION FILED MAR. 18, 1907.

3 SHEETS—SHEET 3.

WITNESSES:
Frank L. Hinton
Ralph Lancaster

INVENTOR.
George Repp.
BY
W. P. Hutchinson,
ATTORNEY.

UNITED STATES PATENT OFFICE.

GEORGE REPP, OF NEW YORK, N. Y.

BAKE-OVEN.

No. 888,034.     Specification of Letters Patent.     Patented May 19, 1908.

Application filed March 18, 1907. Serial No. 362,797.

*To all whom it may concern:*

Be it known that I, GEORGE REPP, of the city, county, and State of New York, have invented a new and useful Improvement in Bake-Ovens, of which the following is a full, clear, and exact description.

My invention relates to improvements in bake-ovens, and more particularly to large ovens of this class such as are used by bakers, hotels, restaurants, and in places where baking is done on a large scale.

The object of my invention is to produce a comparatively simple form of oven on an extensive scale, in which means is provided for distributing heat economically to all parts of the baking oven proper, in which the heat is conserved and held so as to be utilized to the best advantage, and further to provide means for controlling the heat to a nicety, for letting in and releasing the proper amount of steam, and to arrange the construction so that the parts are accessible and the structure economical.

To these ends my invention consists of certain features of construction and combinations of parts which will be hereinafter described and claimed.

Reference is to be had to the accompanying drawings forming a part of this specification, in which similar letters and figures of reference indicate corresponding parts in all the views.

Figure 1:
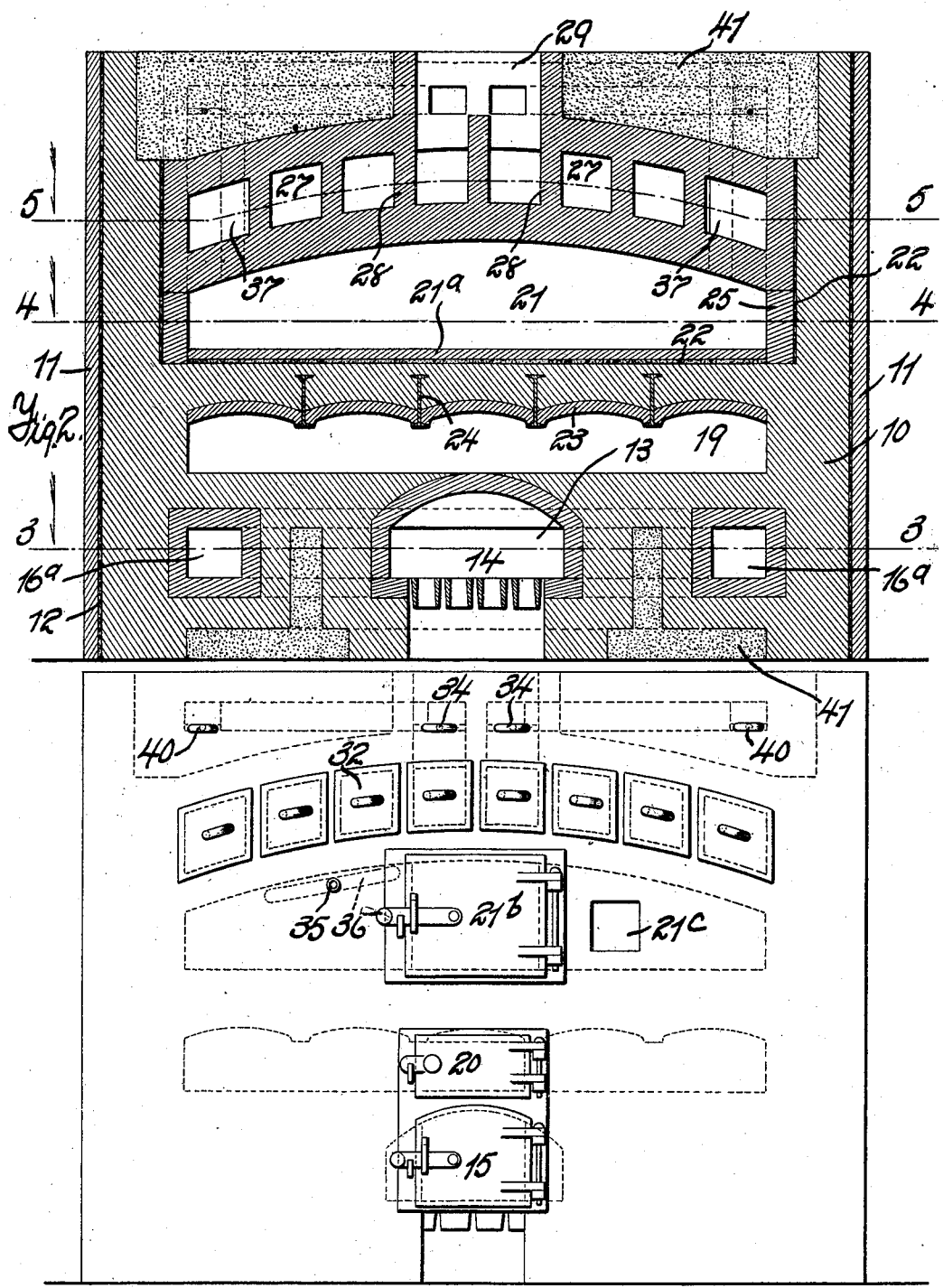
Figure 5:
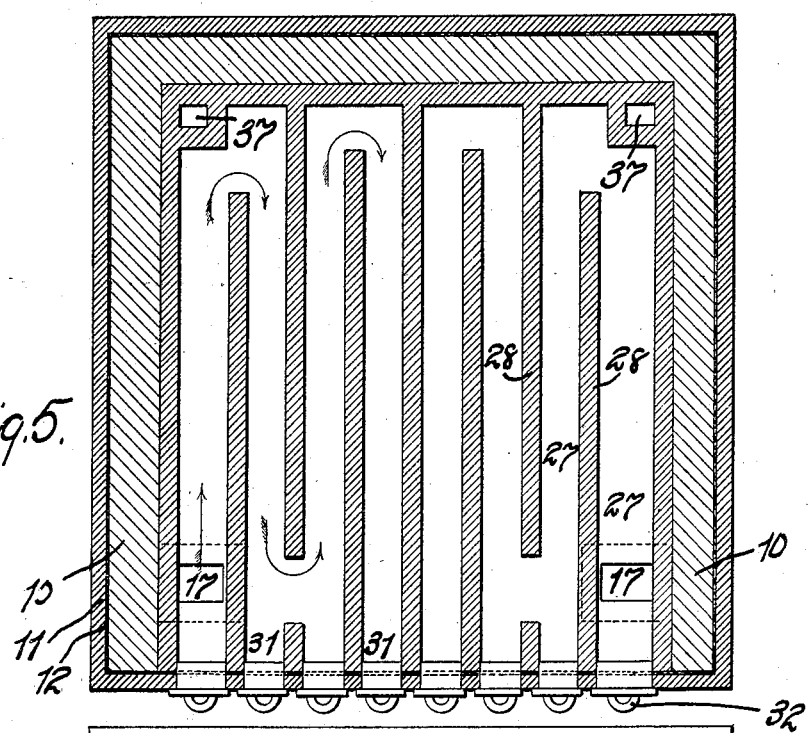

Figure 1 is a front elevation of the oven showing my improvements. Fig. 2 is a vertical section on the line 2.2 of Fig. 6. Fig. 3 is a horizontal section on the line 3.3 of Fig. 2. Fig. 4 is a broken horizontal section on the line 4.4 of Fig. 2. Fig. 5 is a horizontal section on the line 5.5 of Fig. 2, and Fig. 6 is a plan view of the oven with parts broken away, to show the course of the steam flues.

The oven is provided with walls 10 of masonry, which can be ordinary brick, and the outside has preferably a finish of tiling 11, between which and the brick work is a layer 12 of asbestos or other heat insulator. The structure has a suitable fire box 13 which should be lined with fire brick, and which can be of any approved construction, this fire box having a suitable grate 14 and a door 15. The fire box extends rearward to the necessary extent as shown in Fig. 3, the fire box ending practically at the rear of the structure, and it discharges into horizontal flues 16 and 16$^a$, which lead first laterally and then forwardly to a point near the front end of the oven. The flues should be lined with fire brick, and the arrangement provides for an even distribution of heat through the whole mass of masonry, but especially through the interior thereof. At the front ends the flues 16$^a$ merge into vertical flues 17, and these extend upward to a series of flues above the oven proper, as hereinafter described, but in their course they discharge a part of the heat through the ports 18 (see Fig. 4) and from these ports the hot gases and general products of combustion enter the hot air chamber 19, which for cleaning purposes is provided with a suitable door 20 in front (see Fig. 1) and which causes the heat to be evenly distributed beneath the oven proper 21.

Obviously the object of the invention is, besides making a practical and economical structure, to provide means for a suant heat in the oven 21, and to assist in this the oven is provided with an insulating lining or layer 22, which is arranged beneath the bottom 21$^a$ of the oven, and outside the fire brick lining 25. The oven has a suitable door 21$^b$, through which access is had to the oven, and the usual light inlet 21$^c$ is arranged at the side of the door. Just below the oven are arranged the I beams 24, which assist in supporting the oven floor, these being supported in the masonry of the oven, at the ends, as in ordinary brick-work, and the I beams carry the fire brick roof 23 of the hot air chamber 19.

Figure 6:
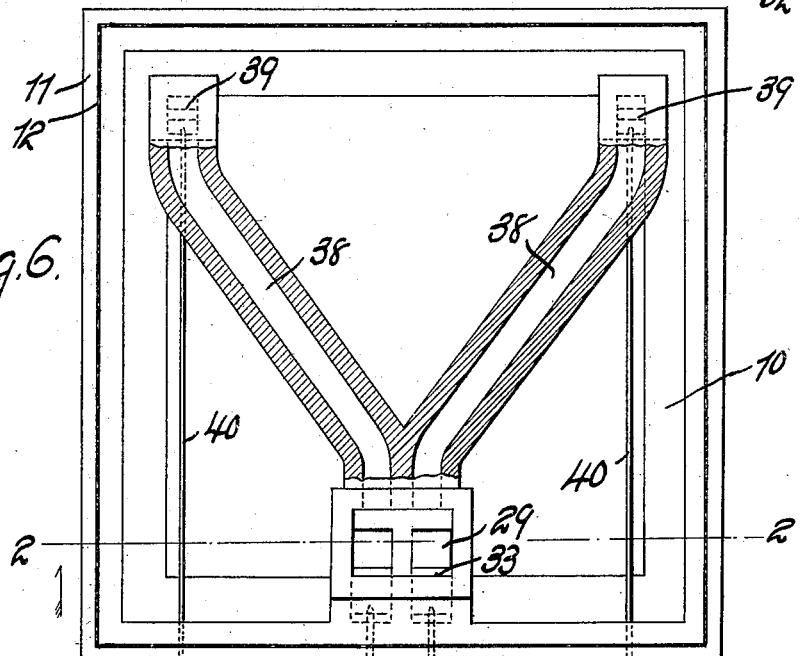

The oven 21 is heated from the top from the flues 27, which are arranged between the vertical partitions 28, and these partitions do not extend quite across the structure from front to back, but one will extend from the front nearly to the back, while the next will extend from the back nearly to the front, as shown clearly in Fig. 5, and thus the hot gases which come up through the flue 17 will zigzag back and forth through the flues 27 and around the partitions 28, giving an even distribution of the heat to the top oven wall, and finally delivering the smoke into a main chimney 29, which is preferably arranged near the front central part of the oven, as shown best in Fig. 6. There are cleaning ports 30 at the rear ends of the fire box and flues 16$^a$, and similar ports 31 are arranged at the front ends of the flues 27, the several ports being closed by thimbles 32. By removing the thimbles, the inner parts of the structure can be readily cleaned out.

The outlet flues are controlled by dampers 33, which are arranged in the chimney 29, and operated by rods 34, extending forward through the oven wall, but obviously any suitable dampers can be used.

To get the right effect it is necessary to supply steam to the oven 21, and this is admitted through a supply pipe 35 and through a suitable sprayer 36, which can be of any preferred kind. The steam escapes from the oven through the flues 37, which lead upward through the back part of the oven structure, and near the top the flues extend forward as shown at 38, to the chimney 29, the passage of steam and heat through the flues being regulated by dampers 39, and rods or handles 40 which extend forward through the furnace wall.

Wherever there is any space in the masonry walls, such space is filled with sand or gravel, as shown at 41, and a bed of this sand is likewise laid upon the top of the structure, the purpose of it being to make a relatively large body of heated matter which will keep the oven at an even temperature.

From the foregoing description and from the structure which I have shown, it will be seen that I have provided an apparatus which is well adapted to retain heat, and which has the heat distributed to and around the baking oven 21 in such a manner that an unusually even temperature can be maintained, and it is well known that this is essential to good baking. Furthermore it will be seen that the structure is one which can be easily built, and that the parts are readily accessible for cleaning or other purposes.

Having thus fully described my invention, I claim as new and desire to secure by Letters Patent:—

1. A masonry baker's oven having a fire-box with essentially horizontal flues extending laterally and forwardly from the rear part of the box, a hot air chamber directly above the fire box, an oven above the hot air chamber, a chimney located in the front part of the structure, circuitous flues extending within the masonry and over the oven top, said flues leading from the front sides backward and forward and discharging into the chimney and having stoppered outlets at the ends through the masonry wall, vertical flues leading upward from the lower horizontal flues and discharging into the said circuitous flues, said vertical flues also discharging into the hot air chamber, and a steam escape from the oven, the steam escape connecting with the chimney by a plurality of damper controlled passages leading from opposite parts of the oven.

2. A masonry baker's oven comprising a horizontal fire-box, a hot air chamber located directly above the fire-box, an oven located above the hot air chamber, a pair of circuitous flues separated from each other in the center and arranged over the oven top, the said flues leading from the front sides of the structure backward and forward having stoppered outlets at the ends, and discharging into the chimney at the front, vertical flues connecting the fire-box with the said circuitous flues, and also with the hot air chamber, and a plurality of damper controlled vents leading from the oven to the chimney.

3. A structure of the kind described comprising a fire-box merging into laterally and forwardly extending horizontal flues, the walls between the fire-box and said flues having hollow portions packed with sand, vertical flues extending upward from the front part of the horizontal flues and forming extensions thereof, a hot air chamber above the fire-box having a connection with the vertical flues, an oven above the hot air chamber, circuitous flues having a plurality of stoppered outlets through the masonry walls extending around over the oven top and forming extensions of the vertical flues, a chimney at the front of the structure connecting with the circuitous flues, and damper controlled flues or vents leading from different points in the oven to the chimney.

GEORGE REPP.

Witnesses:
 PHILIP T. HASLACH,
 WM. F. BAECK.